United States Patent [19]

Swanstrom

[11] Patent Number: 5,338,139
[45] Date of Patent: Aug. 16, 1994

[54] SHROUDED CAPTIVE SCREW

[75] Inventor: Kenneth A. Swanstrom, Doylestown, Pa.

[73] Assignee: Penn Engineering & Manufacturing Corp., Danboro, Pa.

[21] Appl. No.: 138,090

[22] Filed: Oct. 20, 1993

[51] Int. Cl.$^5$ .................. F16B 21/18; F16B 39/00
[52] U.S. Cl. .................. 411/353; 411/107; 411/910; 411/999
[58] Field of Search ........... 411/105, 107, 352, 353, 411/552, 970, 999, 910

[56] References Cited

U.S. PATENT DOCUMENTS

| | | | |
|---|---|---|---|
| 3,245,450 | 4/1966 | Sauter | 411/999 X |
| 3,346,032 | 10/1967 | Gulistan | 411/999 X |
| 3,465,803 | 9/1969 | Ernest et al. | 411/999 X |
| 3,564,563 | 2/1971 | Trotter et al. | 411/552 |
| 3,912,411 | 10/1975 | Moffat | 411/552 X |
| 4,387,497 | 6/1983 | Gulistan | 411/999 X |
| 4,915,557 | 4/1990 | Stafford | 411/353 X |

*Primary Examiner*—Neill R. Wilson
*Attorney, Agent, or Firm*—Gregory J. Gore

[57] ABSTRACT

A panel fastener includes a smooth-surface cylindrical shroud encompassing the periphery of the screw head. The shroud is freely rotatable about the shank of the screw and has sides extending down around the barrel which is affixed to a panel. The shroud is fitted to the screw by an internal flange which is yieldably held between the underside of the screw head and the end of a spring. The top edge of the protective shroud does not extend above the head of the screw. The components are dimensioned so that the sides of the shroud are held away from the top side of the panel when the screw is fully compressed. The fastener may be press-fit into a panel as an assembled unit by applying ram pressure to the top of the screw assembly and barrel.

7 Claims, 1 Drawing Sheet

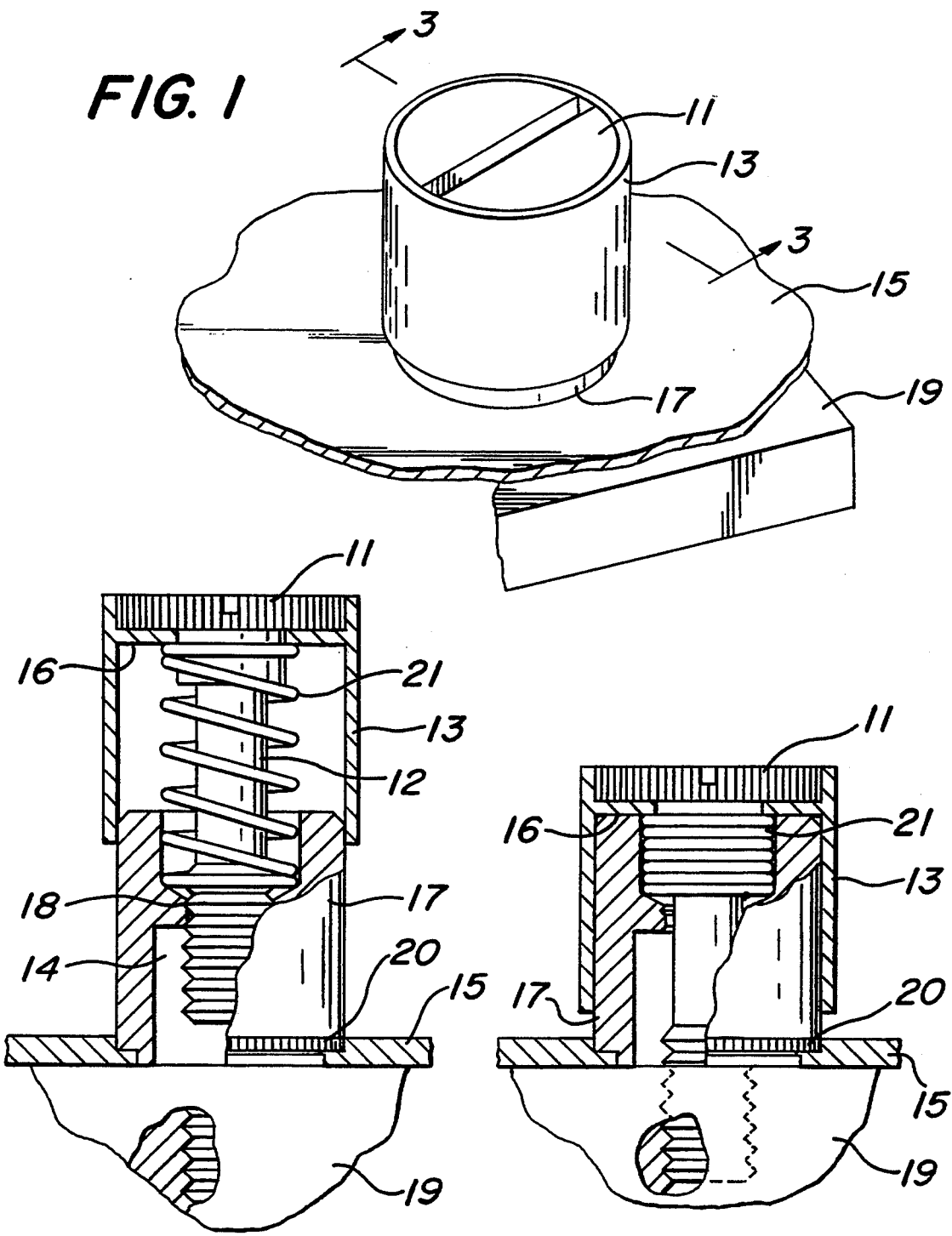

SHROUDED CAPTIVE SCREW

FIELD OF THE INVENTION

The invention relates to a captive screw assembly which is press-fit into a sheet metal plate.

BACKGROUND OF THE INVENTION AND DESCRIPTION OF PRIOR ART

Captive screws used on sheet metal plates, most often releaseable panels, provide a means for securing the panels while providing screw retention to eliminate loose hardware. These devices avoid extra parts and conveniently hold the screws in a resiliently retracted position, yet maintain them attached to the sheet metal panel. The fastener is typically attached to the panel by a screw-surrounding barrel, which is affixed either by press-fit or a rivet-type engagement. The axial movement of the screw is restricted relative to the barrel, and a spring interposed beneath the head of the screw and the end face of the barrel maintains the screw in a retracted position. These screw assemblies are often called "panel fasteners".

The closest prior art of which the applicant is aware includes U.S. Pat. No. 3,465,803 issued to R. B. Ernest et al, and U.S. Pat. No. 3,346,032 issued to B. Gulistan. The Ernest et al panel fastener provides a construction by which the captive screw assembly may be press-fit into the sheet as a unit. The Gulistan captive screw includes a telescoping sleeve which extends from the end of the barrel and surrounds the spring and head of the screw while also providing axial screw retention. The sleeve becomes affixed to the screw head during assembly and, therefore, aids rather than deters manual actuation.

While the panel fasteners of the prior art provide their intended convenience, they are subject to tampering. The screw heads are left exposed and may be easily turned manually. There is therefore a need in the art for a captive panel fastener having all the attributes of the prior art which may be easily applied, but be resistant to manual tampering.

SUMMARY OF THE INVENTION

In order to solve the above-described need in the art for a tamper-resistant captive panel fastener, the present invention has been devised. This fastener includes a smooth-surface cylindrical shroud encompassing the periphery of the screw head. The shroud is freely rotatable about the shank of the screw and has sides extending down around the barrel which is affixed to a panel. The shroud is fitted to the screw by means of an internal flange which is yieldably held between the underside of the screw head and the end of the spring.

The top edge of the protective shroud does not extend axially above the head of the screw. Also, the components are dimensioned so that the sides of the shroud are held away from the top side of the panel when the screw is fully compressed. Therefore, the present invention may be press fit into a panel, such as a metal sheet, as an assembled unit by applying ram pressure to the top of the screw assembly and barrel without applying force to the sides of the shroud.

When the screw is in its tightened condition, the inner flange of the shroud is pinched between the underside of the screw head and top end face of the barrel and therefore in this condition, the shroud is not loose and will not rotate freely. This prevents the possible noisy rattling of loose components under vibration. If one attempts to loosen the fastener without the proper tool, such as by manually turning the sides of the shroud, this tampering will be deterred in two respects. First, the shroud will be difficult to turn because it is smooth-surfaced and difficult to grip manually. Secondly, if by turning the shroud the screw starts to loosen, the pinch on the shroud flange will be lost and the shroud will begin to rotate freely, stopping the further transmission of turning force to the screw.

More specifically described, the present invention provides a captive panel fastener which comprises a screw having a head, a shank of reduced diameter, and a threaded end portion of greater diameter than the shank. A barrel with an internal bore surrounds the screw. The bore includes an area of reduced internal diameter, greater than the diameter of the shank but less than the threaded end portion of the screw, the reduced diameter being located around the shank. A cylindrical shroud encompasses the periphery of the screw head and barrel. The shroud is freely rotatable, except when the screw is fully depressed axially, and includes an internal flange which is yieldably held axially between the top of a spring and the underside of the screw head. The spring acts between the top side of the barrel and the underside of the internal flange. The shroud has a top portion and a bottom portion, the top portion lying above the flange and being shorter than the height of the screw head. The bottom portion extends below the flange, the length of which is less than the length of the barrel.. There are attachment means at the bottom end face of the barrel for affixing the barrel to a metal sheet. The reduced internal diameter of the barrel bore includes threads which are compatible with the threaded end portion of the screw such that the screw may be threaded through and past the internal threads. A separate internally-threaded mounting structure receives the threads of the screw, whereby when the screw is tightened, the metal sheet becomes affixed to the structure. The shroud has smooth sides to reduce friction and resist manual gripping.

It is therefore a primary object of the present invention to provide a captive screw assembly which is tamper-proof. It is a further object of the present invention to provide a tamper-resistant captive screw assembly which may be installed as a unit into a metal sheet by a pressing force. It is yet another object of the present invention to provide a tamper-resistant captive screw assembly having components which are all firmly held against vibration when the screw is in its tightened condition. It is a final object of the present invention to create a tamper-resistant captive panel fastener which is easy to install.

Other objects and advantages of the present invention will be readily understood by those of ordinary skill in the art from the following drawings and description of the preferred embodiment.

BRIEF DESCRIPTIONS OF THE DRAWINGS

FIG. 1 is a top front perspective view of the present invention installed in a metal sheet in its tightened condition.

FIG. 2 is a sectioned and cutaway view showing the present invention installed in a sheet with the screw in its retracted position.

FIG. 3 is a side-sectional cutaway view taken from FIG. 1 as shown in that figure.

DESCRIPTION OF THE PREFERRED EMBODIMENT

Referring now to FIG. 1, the present panel fastener is shown in its tightened-down assembled condition. The top portion of smooth-sided shroud 13 encompasses the periphery of screw head 11 which includes a tool slot. The fastener assembly is clinched into sheet metal plate 15 at the lower extremity of the barrel 17 by attachment means well-known in the art. This attachment means is more clearly shown with reference to FIG. 2 as structure 20. The panel fastener screw affixes sheet 15 to mounting structure 19.

Referring now to FIG. 2, the panel fastener of the present invention is shown in its retracted condition. The assembly is press-fit into metal sheet 15 by clinch-type attachment means 20. Spring means 21 pushes against inner flange 16 of shroud 13 and the underside of the screw head so that the screw is retracted and held away from sheet 15 and structure 19. Because the major diameter of threads 14 is greater than the major diameter of threads 18, the screw will be free-floating, but axially retained by the barrel threads if it is not unscrewed. A smaller diameter portion of the shank 12 of the screw is thus free to move up and down past the narrow thread portion 18. This provides the resilient plunger action of the panel fastener assembly so that the screw may be held in a retracted position, or may be easily pushed down against the mating threads of mounting structure 19 and then tightened. When assembled, screw head 11 is turned so that the threaded portion 14 of the shank is threaded through and past the barrel threads 18.

Shroud 13 includes an inner flange 16 which is yieldably held between the underside of the screw head 11 and the top end of spring 21. It will be understood by observing the mechanical relations of these parts that the shroud is not only resiliently displaceable relative to barrel 17, but also at the option of the user is manually displaceable relative to the screw head 11 prior to tightening. It may be desirable, for example, to move the screw initially down against the mating threads of mounting structure 19 by first manually moving the shroud downward to its fullest extent. This will then expose the screw head for hand-turning so that the threads of the screw may be started. The sides of the screw head, however, will only be accessible up to the final portion of tightening where a tool will be required to turn the screw head to complete the fastening. The fact that the present invention permits manual starting of the screw is an important feature of the invention, which adds to its convenience without limiting its tamper-resistance.

Referring now to FIG. 3, the screw assembly as shown in FIG. 2 is depicted in its fully tightened condition. As seen in this figure, the entire portion of shroud 13 fully encompasses the periphery of screw head 11 making it inaccessible to turning by hand and, therefore, tamper protection is afforded so that a fully tightened screw may be loosened only by the appropriate tool. If an attempt is made to turn shroud 13, manual turning force will be limited by its smooth sides. If the shroud should become turned, as soon as the screw becomes loosened, the pinch on shroud flange 16 between the underside of screw head 13 and the top of barrel 17 will be lost, and shroud 13 will then become freely rotatable. Therefore, no further turning force can be transmitted to the screw by turning the shroud, hence, manual removal of the screw is prevented.

It should be readily understood with reference to FIGS. 1 through 3 and the foregoing description that all of the above-mentioned objects of the present invention have been achieved to provide a convenient, tamper-resistant captive panel fastener needed in the fastener arts. The shroud also provides the present panel fastener with a pleasing appearance and affords the spring and plunger components protection against the accumulation of dirt and debris. Another benefit of the present invention is that it may be easily disassembled by simply backing out the screw threads from the barrel threads.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. A captive panel fastener, comprising:
   a screw having a head, a shank of reduced diameter, and a threaded end portion of greater diameter than said shank;
   a barrel with an internal bore surrounding said screw, the bore including an area of reduced internal diameter greater than the diameter of said shank but less than said threaded end portion of said screw, said reduced diameter located about said shank;
   a cylindrical shroud encompassing the periphery of said screw head and said barrel, said shroud being freely rotatable except when the screw is fully depressed axially, said shroud including an internal flange which is yieldably held between the top of a spring and the underside of said screw head, said spring acting between the top side of said barrel and the underside of said internal flange.

2. The panel fastener of claim 1, further described in that said shroud has a top portion and a bottom portion, said top portion lying above said flange and not greater than the height of said screw head.

3. The panel fastener of claim 2, further described in that said bottom portion extends below said flange, the length of said bottom portion being less than the length of said barrel.

4. The panel fastener of claim 1, further including attachment means at the bottom end of said barrel for affixing said barrel to a metal sheet.

5. The panel fastener of claim 1, further described in that said reduced internal diameter of the barrel bore includes threads which are compatible with the threaded end portion of said screw such that said screw may be threaded through and past said reduced internal diameter.

6. The panel fastener of claim 5, further including an internally-threaded mounting structure for receiving the threads of said screw, whereby when said screw is tightened, said metal sheet is affixed to said structure.

7. The panel fastener of claim 6, further described in that said shroud has smooth sides to reduce friction and resist manual gripping.

* * * * *